United States Patent
Kubik et al.

(10) Patent No.: US 10,924,559 B1
(45) Date of Patent: Feb. 16, 2021

(54) MIGRATION OF CLOUD SERVICES

(71) Applicant: International Business Machines Corporation, Armonk, NY (US)

(72) Inventors: Matthias Kubik, Dettenhausen (DE); Joerg Mueller, Horb (DE); Thomas Prause, Rottenburg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/568,763

(22) Filed: Sep. 12, 2019

(51) Int. Cl.
| | | |
|---|---|---|
| *H04L 12/24* | (2006.01) | |
| *H04L 29/08* | (2006.01) | |
| *G06F 9/455* | (2018.01) | |
| *H04L 12/14* | (2006.01) | |

(52) U.S. Cl.
CPC .......... *H04L 67/16* (2013.01); *G06F 9/45558* (2013.01); *H04L 12/1421* (2013.01); *H04L 67/1008* (2013.01); *G06F 2009/4557* (2013.01)

(58) Field of Classification Search
CPC . H04L 67/16; H04L 12/1421; H04L 67/1008; H04L 41/50; H04L 41/5041; H04L 41/5048; H04L 41/08; H04L 41/0803; H04L 41/0853; H04L 41/0893; G06F 9/45558
USPC .................................................. 709/206, 226
See application file for complete search history.

(56) References Cited

U.S. PATENT DOCUMENTS

| | | | |
|---|---|---|---|
| 9,680,696 B1* | 6/2017 | Firment | G06F 9/5072 |
| 10,255,370 B2 | 4/2019 | Carpenter | |
| 2012/0239739 A1* | 9/2012 | Manglik | G06F 9/5077 709/203 |
| 2013/0091285 A1 | 4/2013 | Devarakonda | |

OTHER PUBLICATIONS

"Infrastructure as code", Wikipedia, page was edited on Jun. 24, 2019, 5 pages, <https://en.wikipedia.org/wiki/Infrastructure_as_code>.
Banerjee et al., "An Approach to Cost-Effective Transformation of Workloads towards Cloud Delivery Models", International Journal of Computer Applications (0975-8887), vol. 82-No. 14, Nov. 2013, 8 pages.
Mell et al., "The NIST Definition of Cloud Computing", National Institute of Standards and Technology U.S. Department of Commerce, Special Publication 800-145, Sep. 2011, 7 pages.

* cited by examiner

*Primary Examiner* — Glenford J Madamba
(74) *Attorney, Agent, or Firm* — Stephanie L. Carusillo

(57) ABSTRACT

In an approach for migrating cloud services between cloud providers, a processor transforms a set of IaC resources of a cloud service on an initial cloud provider into a reference architecture to be deployed to a set of cloud providers. A processor gathers a set of indicators from the set of cloud providers. A processor compares the set of indicators from the set of cloud providers. Responsive to determining that an affinity score was reached for an alternate cloud provider, a processor outputs an alert to an owner of the cloud service, wherein the alert requests approval to migrate the cloud service from the initial cloud provider to the alternate cloud (Continued)

provider. Responsive to receiving approval from the owner, a processor migrates the cloud service to the alternate cloud provider.

20 Claims, 9 Drawing Sheets

MIGRATION OF CLOUD SERVICES

BACKGROUND

The present invention relates generally to cloud infrastructures, and more particularly to migrating infrastructures of cloud applications between cloud providers.

Infrastructure as Code (IaC) is the management of infrastructure, including networks, virtual machines, load balancers, and connection topology, through machine-readable definition files. IaC approaches are promoted for cloud computing and support cloud services.

There are generally three approaches to IaC: declarative (functional) vs. imperative (procedural) vs. intelligent (environment aware). The difference between the declarative, the imperative, and the intelligent approach is essentially 'what' versus 'how' versus 'why'. The declarative approach focuses on what the eventual target configuration should be; the imperative focuses on how the infrastructure is to be changed to meet this; the intelligent approach focuses on why the configuration should be a certain way in consideration of all the co-relationships and co-dependencies of multiple applications running on the same infrastructure typically found in production. The declarative approach defines the desired state and the system executes what needs to happen to achieve that desired state. Imperative defines specific commands that need to be executed in the appropriate order to end with the desired conclusion. The intelligent determines the correct desired state before the system executes what needs to happen to achieve a desired state that does not impact co-dependent applications. Environment aware desired state is the next generation of IaC.

There are two methods of IaC: 'push' and 'pull'. The main difference is the manner in which the servers are told how to be configured. In the pull method, the server to be configured will pull its configuration from the controlling server. In the push method, the controlling server pushes the configuration to the destination system.

Cloud migration is the process of moving data, applications or other business elements to a cloud computing environment. There are various types of cloud migrations an enterprise can perform. One common model is the transfer of data and applications from a local, on-premises data center to the public cloud. However, a cloud migration could also entail moving data and applications from one cloud platform or provider to another, a model known as cloud-to-cloud migration. A third type of migration is to uncloud, also known as a reverse cloud migration or declouding, where data or applications are moved off of the cloud and back to a local data center.

The general goal or benefit of any cloud migration is to host applications and data in the most effective IT environment possible, based on factors such as cost, performance and security. For example, many organizations perform the migration of on-premises applications and data from their local data center to public cloud infrastructure to take advantage of benefits, such as greater elasticity, self-service provisioning, redundancy and a flexible, pay-per-use model.

The steps or processes an enterprise follows during a cloud migration vary based on factors such as the type of migration it wants to perform and the specific resources it wants to move. That said, common elements of a cloud migration strategy include evaluating performance and security requirements, choosing a cloud provider, calculating costs and making any necessary organizational changes.

SUMMARY

Aspects of an embodiment of the present invention disclose a method, a computer program product, and a computer system for migrating cloud services between cloud providers. A processor transforms a set of IaC resources of a cloud service on an initial cloud provider into a reference architecture to be deployed to a set of cloud providers. A processor gathers a set of indicators from the set of cloud providers. A processor compares the set of indicators from the set of cloud providers. Responsive to determining that an affinity score was reached for an alternate cloud provider, a processor outputs an alert to an owner of the cloud service, wherein the alert requests approval to migrate the cloud service from the initial cloud provider to the alternate cloud provider. Responsive to receiving approval from the owner, a processor migrates the cloud service to the alternate cloud provider.

DETAILED DESCRIPTION

Figure 1:
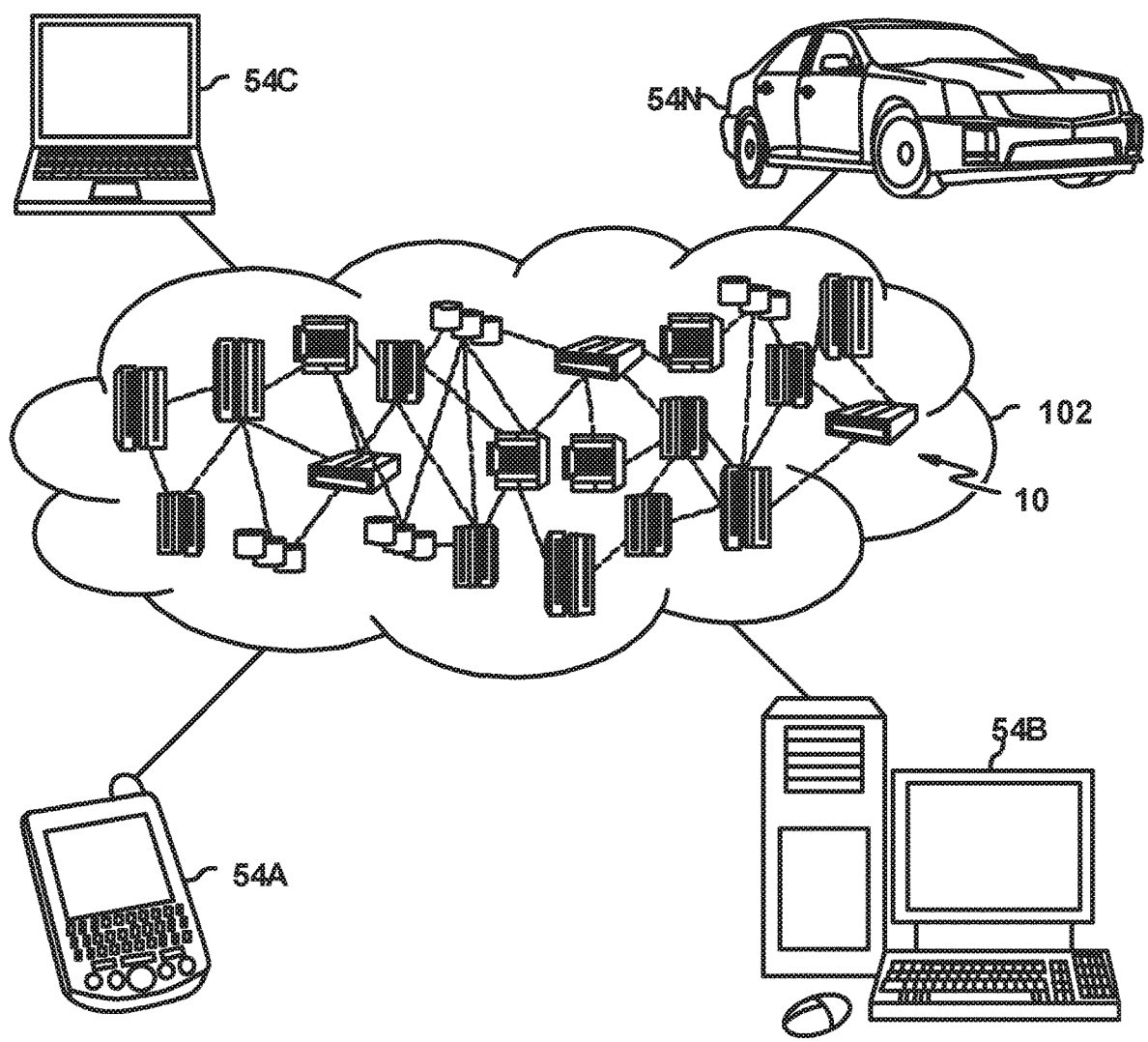
FIG. 1 depicts a cloud computing environment according to an embodiment of the present invention.

Embodiments of the present invention recognize that cloud infrastructures are becoming more commonly used and with that comes an increase in the number of cloud providers. To attract new customers, these new cloud providers are offering competitive pricing. Comparing cloud providers may be difficult due to cloud providers using different naming conventions of components and resources with different pricing models. Embodiments of the present invention recognize the need for a more efficient way of comparing the offerings of the different cloud providers.

Additionally, vendor lock-in is a common business pattern for cloud providers. Vendor lock-in makes it difficult to change cloud providers because the cost to migrate a cloud service is too high. Common challenges an enterprise faces during a cloud migration include interoperability, data and application portability, data integrity and security, and business continuity. Without proper planning, a migration could negatively affect workload performance and lead to higher IT costs, thereby negating some of the main benefits of cloud computing. Embodiments of the present invention further recognize the need for a migration system that lowers the cost and time associated with the transition of a cloud service from one cloud provider to another.

Embodiments of the present invention provide a program for migrating cloud services between cloud providers. Embodiments of the present invention involve reading and deciphering the code defining a cloud service of a source cloud provider, transforming the cloud service definition into IaC code understood by a target cloud provider, and minimizing the universal IaC code by a pre-determined factor to create a reference architecture. Embodiments of the present invention further involve comparing prices and run time characteristics of various cloud providers by observing static and run time characteristics of running the reference architecture on various cloud providers. Lastly, embodiments of the present invention involve establishing cloud resources to re-create the cloud service and the associated resources and data on the target cloud provider and migrating the cloud service from the source cloud provider to the target cloud provider.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, cnetworks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

The present invention will now be described in detail with reference to the Figures.

In FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
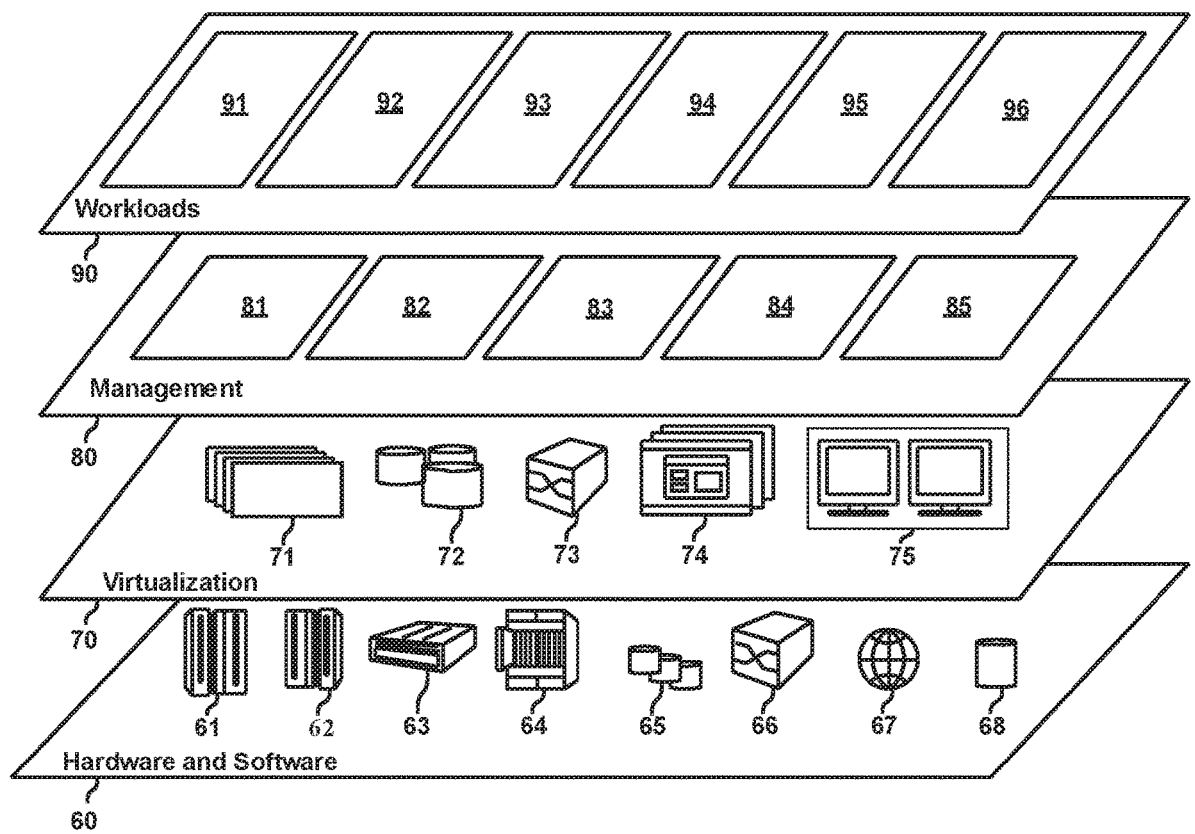
FIG. 2 depicts abstraction model layers according to an embodiment of the present invention.

In FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

Figure 3:
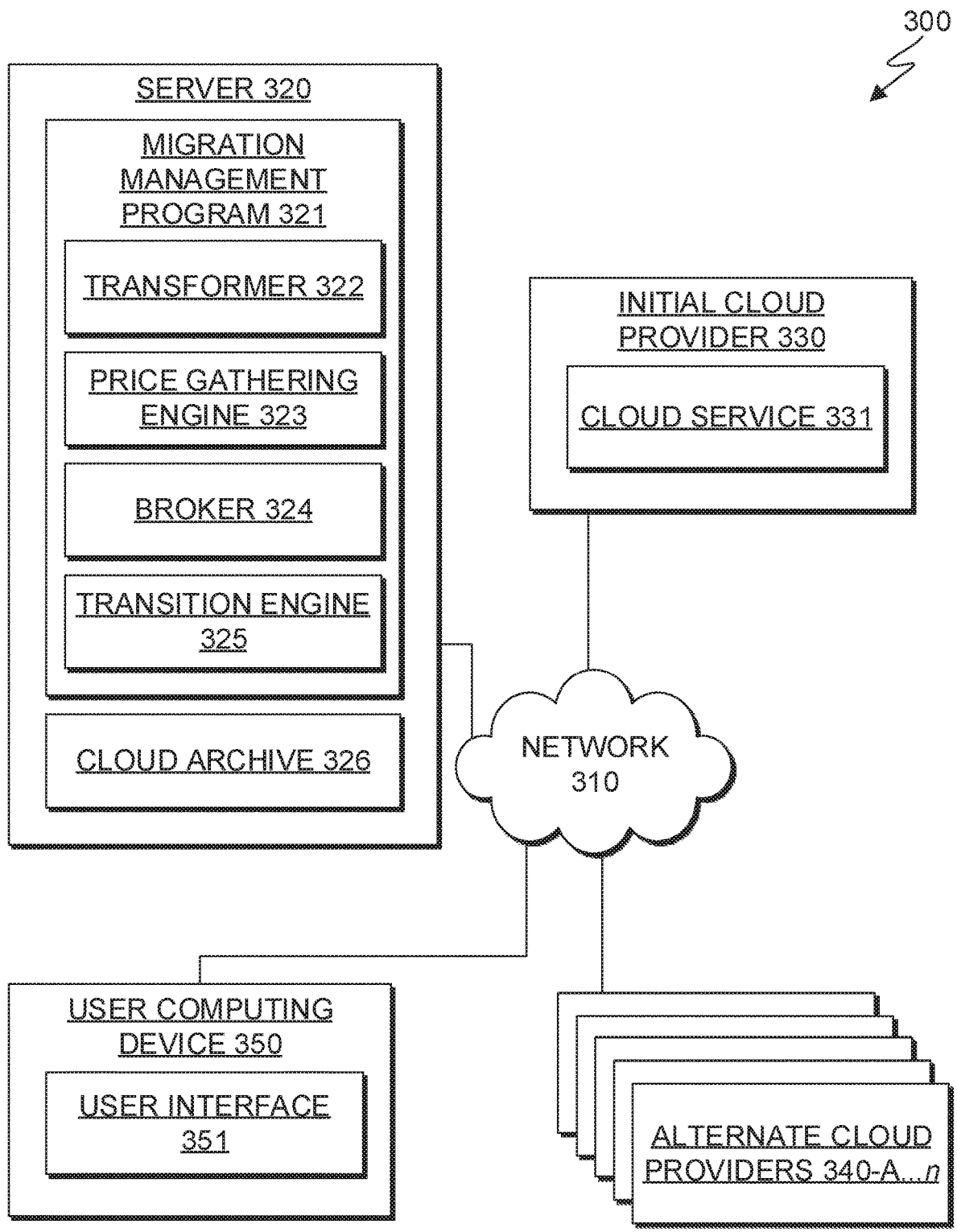
FIG. 3 is a functional block diagram illustrating a cloud migration environment, in accordance with an embodiment of the present invention.

FIG. 3 is a functional block diagram illustrating cloud migration environment 300, in accordance with an embodiment of the present invention. FIG. 3 provides only an illustration of one embodiment of the present invention and does not imply any limitations with regard to the environments in which different embodiments may be implemented. In the depicted embodiment, cloud migration environment 300 includes server 320, source cloud provider 330, alternate cloud providers 340-A . . . n, and user computing device 350 interconnected over network 310. Cloud migration environment 300 may include additional computing devices, servers, computers, or other devices not shown.

Network 310 operates as a computing network that can be, for example, a telecommunications network, a local area network (LAN), a wide area network (WAN), such as the Internet, or a combination of the three, and can include wired, wireless, or fiber optic connections. Network 310 can include one or more wired and/or wireless networks capable of receiving and transmitting data, voice, and/or video signals, including multimedia signals that include voice, data, and video information. In general, network 310 can be any combination of connections and protocols that will support communications between server 320, source cloud provider 330, alternate cloud providers 340-A . . . n, and user computing device 350.

Server 320 operates to run migration management program 321 and to send and/or store data in cloud archive 326. In an embodiment, server 320 can send data from cloud archive 326 to source cloud provider 330, alternate cloud providers 340-A . . . n, and user computing device 350. In an embodiment, server 320 can receive data in cloud archive 326 from source cloud provider 330, alternate cloud providers 340-A . . . n, and user computing device 350. In some embodiments, server 320 may be a management server, a web server, or any other electronic device or computing system capable of receiving and sending data. In some embodiments, server 320 may be a laptop computer, a tablet computer, a netbook computer, a personal computer (PC), a desktop computer, a smart phone, or any programmable device capable of communication with source cloud provider 330, alternate cloud providers 340-A . . . n, and user computing device 350 via network 310. In other embodiments, server 320 represents a server computing system utilizing multiple computers as a server system, such as in a cloud computing environment. Server 320 may include components as described in further detail in FIG. 9.

Migration management program 321 operates to migrate cloud services between cloud providers. In an embodiment, migration management program 321 transforms a set of IaC resources of a cloud service, e.g., cloud service 331, into an IaC reference architecture that can be deployed to a set of cloud providers, e.g., source cloud provider 330 and alternate cloud providers 340-A . . . n. In an embodiment, migration management program 321 gathers indicators from the set of cloud providers, e.g., alternate cloud providers 340-A . . . n, in order to calculate an affinity score. In an embodiment, migration management program 321 compares the indicators to determine which cloud provider, e.g., alternate cloud provider 340-A, is the most efficient in terms of cost and performance for the cloud service. In an embodiment, migration management program 321 outputs an alert to an owner of the cloud server when the total cost for a set of services on an alternate cloud provider reaches the affinity score. In an embodiment, upon receiving approval, migration management program 321 migrates cloud service 331 from source cloud provider 330 to one of alternate cloud providers 340-A . . . n.

In other embodiments, migration management program 321 migrates the set of cloud resources of the cloud service to multiple alternate cloud providers based on indicators received from the alternate cloud providers and a calculated affinity score for one or more cloud resources of the cloud service. For example, migration management program 321 determines to migrate cloud resources A and B of cloud service 331 to alternate cloud provider 140-B and cloud resources C, D, and E of cloud service 331 to alternate cloud provider 140-C.

In an embodiment, migration management program 321 has four main functions or components: transformer 322, price gathering engine 323, broker 324, and transition engine 325. In the depicted embodiment, migration management program 321 resides on server 320. In other embodiments, migration management program 321 or any of the four many functions may reside on user computing device 350, or another computing device (not shown), provided that migration management program 321 has access to network 310.

Cloud archive 326 operates as a repository for a reference architecture and a set of IaC resources. Cloud archive 326 can be implemented with any type of storage device capable of storing data and configuration files that can be accessed and utilized by server 320, such as a database server, a hard disk drive, or a flash memory. In an embodiment, cloud archive 326 is accessed by server 320, source cloud provider 330, alternate cloud providers 340-A . . . n, and user computing device 350 to store and/or access the data. In the depicted embodiment, cloud archive 326 resides on server 320. In another embodiment, cloud archive 326 may reside elsewhere within cloud migration environment 300, provided that cloud archive 326 has access to network 310.

Source cloud provider 330 operates as the cloud provider that cloud service 331 initially runs on. Alternate cloud providers 340-A . . . n operate as alternative cloud providers that could run cloud service 331, in which n refers to any number of alternate cloud providers.

User computing device 350 operates to run user interface 351 through which an owner of cloud service 331 can approve of the migration of cloud service 331 to an alternate cloud provider, e.g., alternate cloud provider 340-A, that is more efficient than the initial cloud provider, e.g., source cloud provider 330, in terms of cost and performance. In an embodiment, user computing device 350 receives a request from broker 324 via network 310 to approve of the migration of the owner's cloud service to a more efficient cloud provider, e.g., cloud service 331 to alternate cloud provider 340-A. In some embodiments, user computing device 350 may be, but is not limited to, an electronic device, such as a laptop computer, a tablet computer, a netbook computer, a personal computer (PC), a desktop computer, a smart phone, or any programmable electronic device capable of running user interface 351 and communicating (i.e., sending and receiving data) with server 320 and migration management program 321 via network 310. In some embodiments, user computing device 350 represents one or more programmable electronic devices capable of executing machine readable program instructions and communication with server 320 and/or other computing devices (not shown) within cloud migration environment 300 via a network, such as network 310. In an embodiment, user computing device 350 includes an instance of user interface 351. User computing device 350 may include components as described in further detail in FIG. 9.

User interface 351 operates as a local user interface on user computing device 350 through which an owner can approve of the migration of the owner's cloud service to a more efficient cloud provider. In some embodiments, user interface 351 is a graphical user interface (GUI), a web user interface (WUI), and/or a voice user interface (VUI) that can display (i.e., visually) or present (i.e., audibly) alerts including information (such as graphics, text, and/or sound) sent from migration management program 321 via network 310.

In an embodiment, user interface 351 is capable of sending and receiving data, i.e., to and from migration management program 321 via network 310, respectively.

Figure 4:
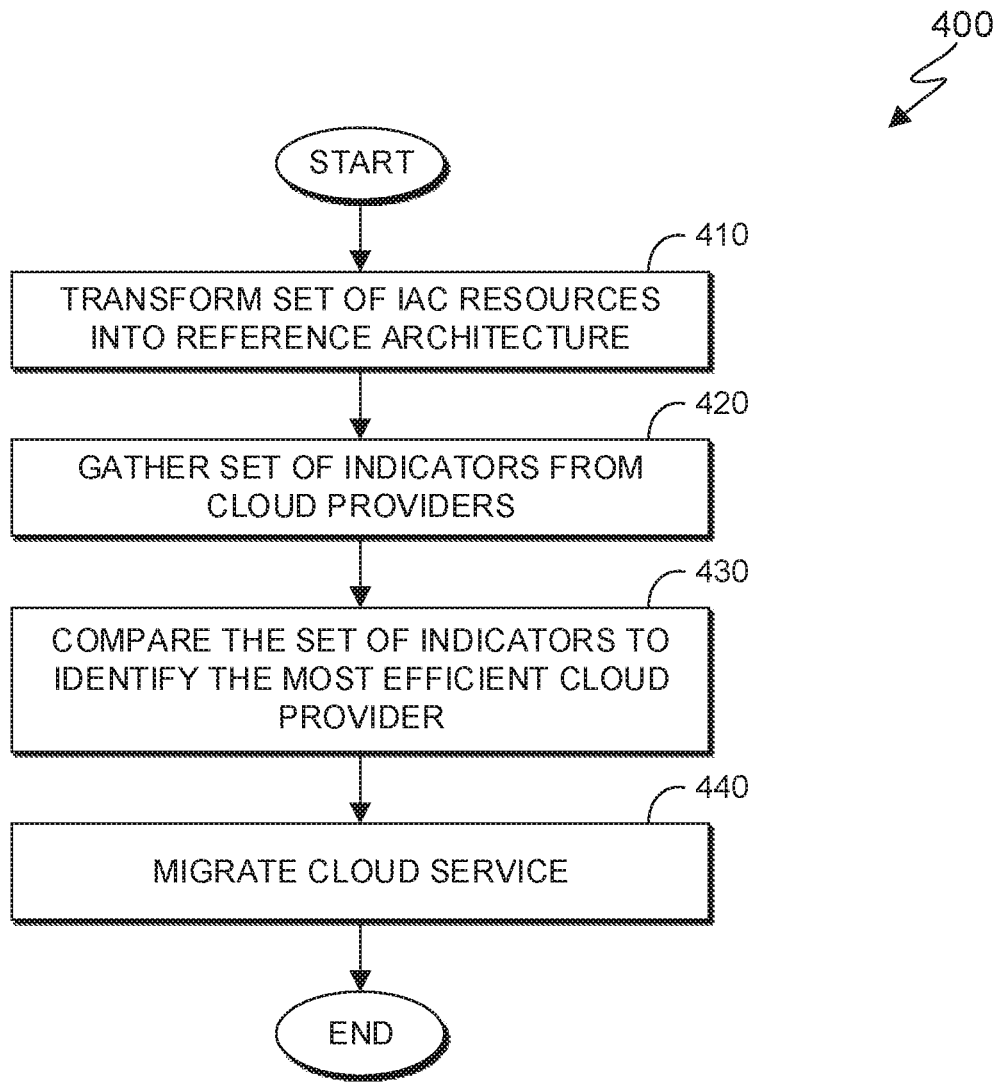
FIG. 4 is a flowchart depicting a migration management program executed within the cloud migration environment of FIG. 3, in accordance with an embodiment of the present invention.

FIG. 4 depicts flowchart 400 of the steps of migration management program 321 executed within cloud migration environment 300 as depicted in FIG. 3, in accordance with an embodiment of the present invention. In an embodiment, migration management program 321 uses transformer 322 to transform a set of IaC resources of a cloud service into an IaC reference architecture. Transformer 322 is described in further detail in FIG. 5. In an embodiment, migration management program 321 uses price gathering engine 323 to gather a set of indicators from each cloud provider in order to calculate a score for each. Price gathering engine 323 is described in further detail in FIG. 6. In an embodiment, migration management program 321 uses broker 324 to calculate the scores and to identify a cloud provider, i.e., alternate cloud provider 340-A, that reaches an affinity score. Broker 324 is described in further detail in FIG. 7. In an embodiment, migration management program 321 uses transition engine 325 to migrate cloud service 331 from source cloud provider 330 to alternate cloud provider 340-A. Transition engine 325 is described in further detail in FIG. 8. It should be appreciated that the process depicted in FIG. 4 illustrates one possible iteration of the process flow.

Figure 5:
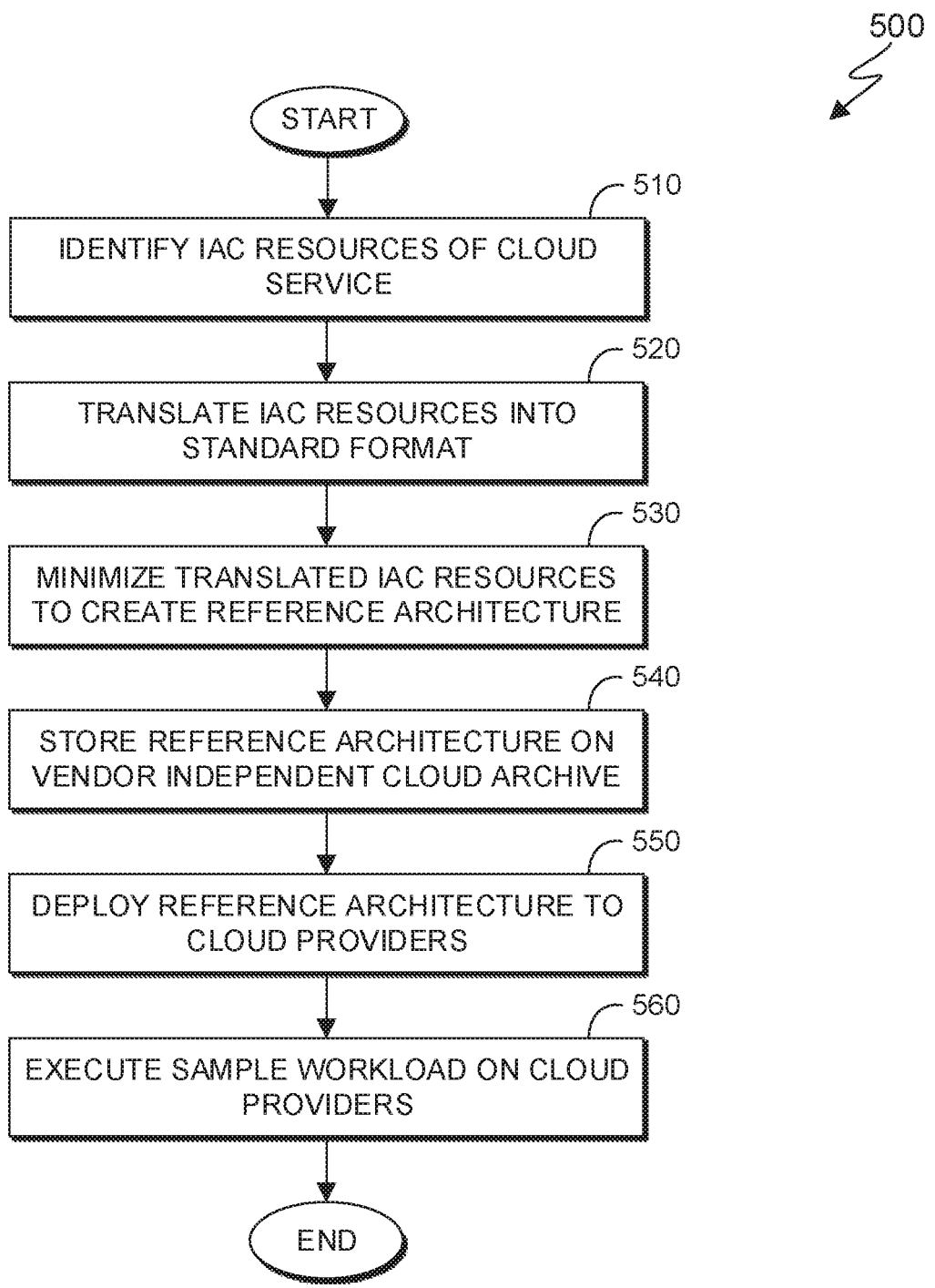
FIG. 5 depicts a flowchart of the steps for a first component of the migration management program executed within the cloud migration environment of FIG. 3, in accordance with an embodiment of the present invention.

FIG. 5 depicts flowchart 500 of the steps for transformer 322 of migration management program 321 executed within cloud migration environment 300 as depicted in FIG. 3, in accordance with an embodiment of the present invention. In an embodiment, transformer 322 identifies a set of IaC resources of the cloud service. In an embodiment, transformer 322 translates the IaC resources. In an embodiment, transformer 322 minimizes the translated IaC resources to create an IaC reference architecture. In an embodiment, transformer 322 creates a vendor independent cloud archive. In an embodiment, transformer 322 deploys the IaC reference architecture to a set of cloud providers. In an embodiment, transformer 322 executes a sample workload on the set of cloud providers. It should be appreciated that the process depicted in FIG. 5 illustrates one possible iteration of the process flow.

In step 510, transformer 322 identifies a set of IaC resources of the cloud service. In an embodiment, transformer 322 identifies a set of IaC resources of cloud service 331 on source cloud provider 330. The set of IaC resources includes base resources and supplemental resources. Base resources are the core resources of cloud service 331. Supplemental resources are the resources required to run cloud service 331. For example, supplemental resources include, but are not limited to, object storage, database services, authentication, and billing.

In step 520, transformer 322 translates the set of IaC resources. In an embodiment, transformer 322 translates the set of IaC resources into an industry wide standard format. In an embodiment, transformer 322 translates the set of IaC resources into an open source based IaC tooling, e.g., HashiCorp Configuration Language (HCL), an open source-based standard language. In other embodiments, transformer 322 translates the set of IaC resources into any open source-based standard language known in the art.

In step 530, transformer 322 minimizes the translated set of IaC resources. In some embodiment, transformer 322 minimizes the translated set of IaC resources by a factor, e.g., 10, 100, or 1000, based on the amount of IaC resources. The goal is to minimize the set of IaC resources as much as possible to keep the costs of running sample workloads of the cloud service on the cloud providers as low as possible.

For example, if there are 300 container worker nodes used for the cloud service, then transformer 322 minimizes the set of IaC resources by a factor of 100 for creating the reference architecture. In another example, if the set of IaC resources includes 23 nodes, then transformer 322 minimizes the set of IaC resources by a factor of 10 for creating the reference architecture. In an embodiment, transformer 322 creates an IaC reference architecture from the translated and minimized set of IaC resources. An IaC reference architecture is the smallest entity to which the translated set of IaC resources could be minimized. An IaC reference architecture is also the essential and key performance indicator that is measured during the execution of a sample workload of a cloud service. A sample workload of a cloud service is a pre-defined set of operations that includes, but is not limited to, page requests, database transactions, and calculations.

In step 540, transformer 322 creates a vendor independent cloud archive. In an embodiment, transformer 322 creates the vendor independent cloud archive, e.g., cloud archive 326, to store the IaC reference architecture with the translated resources. In subsequent iterations, after transformer 322 creates the cloud archive, transformer 322 uses and/or updates the cloud archive, i.e., cloud archive 326, to store the IaC reference architecture with the translated resources.

In step 550, transformer 322 deploys the IaC reference architecture. In an embodiment, transformer 322 deploys the IaC reference architecture to the cloud providers, e.g., source cloud provider 330 and alternate cloud providers 340-A . . . n. In an embodiment, transformer 322 deploys the IaC reference architecture on a free tier basis, which means the IaC reference architecture is minimized enough that the IaC reference architecture is free, i.e., there is no cost, to run on the alternate cloud provider. In other embodiments, transformer 322 deploys the IaC reference architecture on a paid tier basis, which has associated costs. In other embodiments, transformer 322 deploys the IaC reference architecture with a combination of free tiers and cost tiers.

The transformation process can be formalized in a mathematical process in which R is the sum of all cloud resources running on a given cloud provider. The cloud archive, e.g., cloud archive 326, transforms the resources into a human readable, generalized, portable format A such that $f(R)=A$, $f^{-1}(A)=R$, $g^{-1}(A)=R'$, where g is a transformation to another cloud provider's workload R', and so that the portable format can be re-created on the same or another cloud provider. An individual workload resource r can be transformed to and from a specific cloud provider such that $t(r)=a$ and $t^{-1}(a)=r$, where a is an individual resource in the portable format. This results in the following resource migration: $f(R)=sum[t(r)]=A$ and $f(A)=sum[t(a)]=R$.

In step 560, transformer 322 executes the sample workload of the cloud service. In an embodiment, transformer 322 executes the sample workload of the cloud service on the set of cloud providers. In an embodiment, transformer 322 executes the same sample workload of the cloud service on the set of cloud providers to determine which cloud provider is the most efficient in terms of cost and performance based on pricing information provided by the cloud providers and performance measures with weights for each performance measures provided by the cloud provider that will be used to calculate a score for each cloud provider. In an embodiment, after executing the sample workload, transformer 322 identifies a set of indicators from each cloud provider based on the execution of the sample workload, in which the set of indicators includes the pricing information and/or the performance measures.

Figure 6:
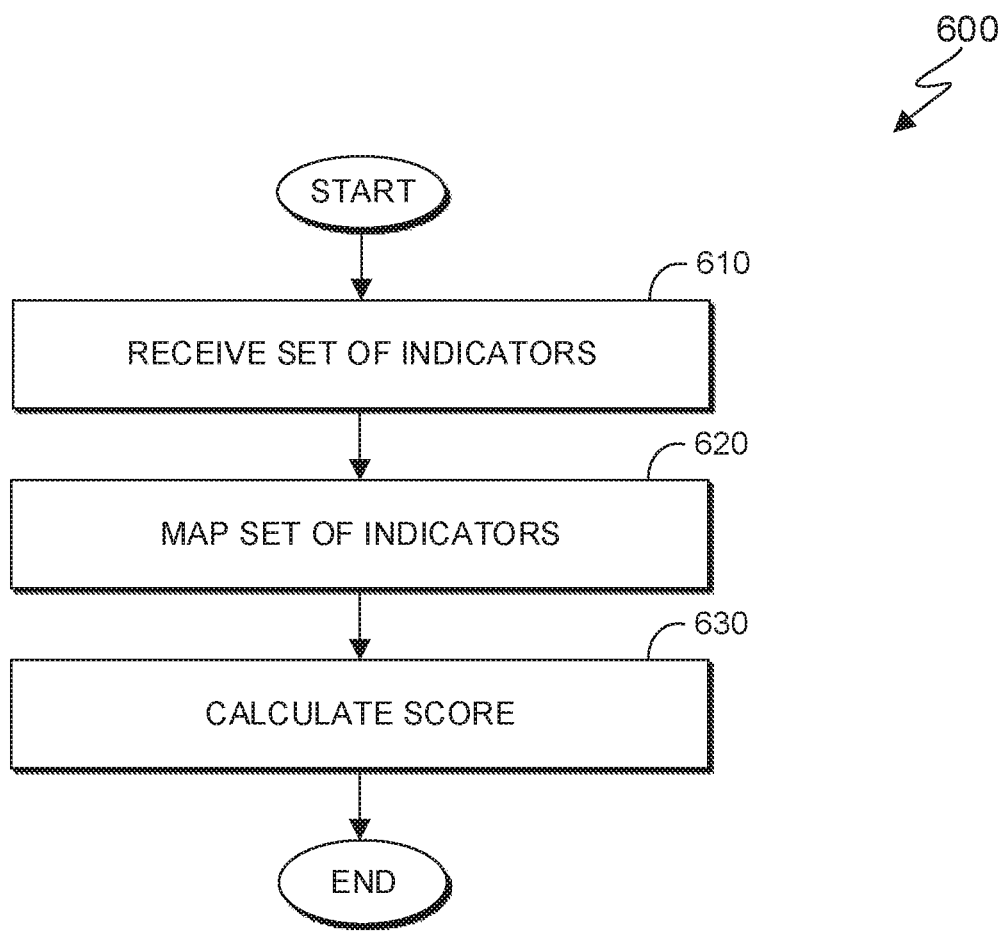
FIG. 6 depicts a flowchart of the steps for a second component of the migration management program executed within the cloud migration environment of FIG. 3, in accordance with an embodiment of the present invention.

FIG. 6 depicts flowchart 600 of the steps for price gathering engine 323 of migration management program 321 executed within cloud migration environment 300 as depicted in FIG. 3, in accordance with an embodiment of the present invention. In an embodiment, price gathering engine 323 receives a set of indicators. In an embodiment, price gathering engine 323 maps the set of indicators. In an embodiment, price gathering engine 323 calculates a score for each cloud provider based on the set of indicators and a weight for each indicator. It should be appreciated that the process depicted in FIG. 6 illustrates one possible iteration of the process flow.

In step 610, price gathering engine 323 receives the set of indicators. In an embodiment, price gathering engine 323 receives the set of indicators from each sample workload previously executed in step 360 by transformer 322. The set of indicators includes, but is not limited to, a price indicator based on a cost to run a cloud service, a cost to re-create the cloud service on the second cloud provider, and a cost to migrate the cloud service from the first cloud provider to the second cloud provider. For example, the price indicator will calculate the cost to run cloud service 331 on source cloud provider 330, the cost to re-create cloud service 331 on alternate cloud providers 340-A . . . n, and the cost to migrate cloud service 331 from source cloud provider 330 to alternate cloud provider 340-A. The cloud service consists of several associated cloud resources and that consequently means that there will be several cloud resources costs that will sum up to the cost of the cloud service. The set of indicators also includes, but is not limited to, a performance indicator, a compliance indicator, a security indicator, and a reliability indicator. In some embodiments, the set of indicators may also include an environmental indicator based on the environmental impact of the cloud resource. In some embodiments, the set of indicators may also include a legal indicator and/or latency indicator.

In step 620, price gathering engine 323 maps the set of indicators. In an embodiment, price gathering engine 323 maps the set of indicators to determine which cloud provider of the set of cloud providers is the most efficient for running the cloud service in terms of cost and performance. In an embodiment, price gathering engine 323 maps the set of indicators based on the weights, provided by the cloud providers, for each indicator.

In step 630, price gathering engine 323 calculates a score. In an embodiment, price gathering engine 323 calculates a score for each cloud provider based on the set of indicators and a weight for each indicator. In an embodiment, the set of indicators include price, performance, compliance, security, and reliability. In an embodiment, the weight for each indicator is received with the set of indicators from each cloud provider. The weights are used by the cloud providers to specify how important an indicator is to that cloud provider. In an embodiment, the affinity score is defined as $S=\Sigma_i \rho_i * \varepsilon_i$ where $\rho$ are the parameters, c are the weights, and S is a score.

Figure 7:
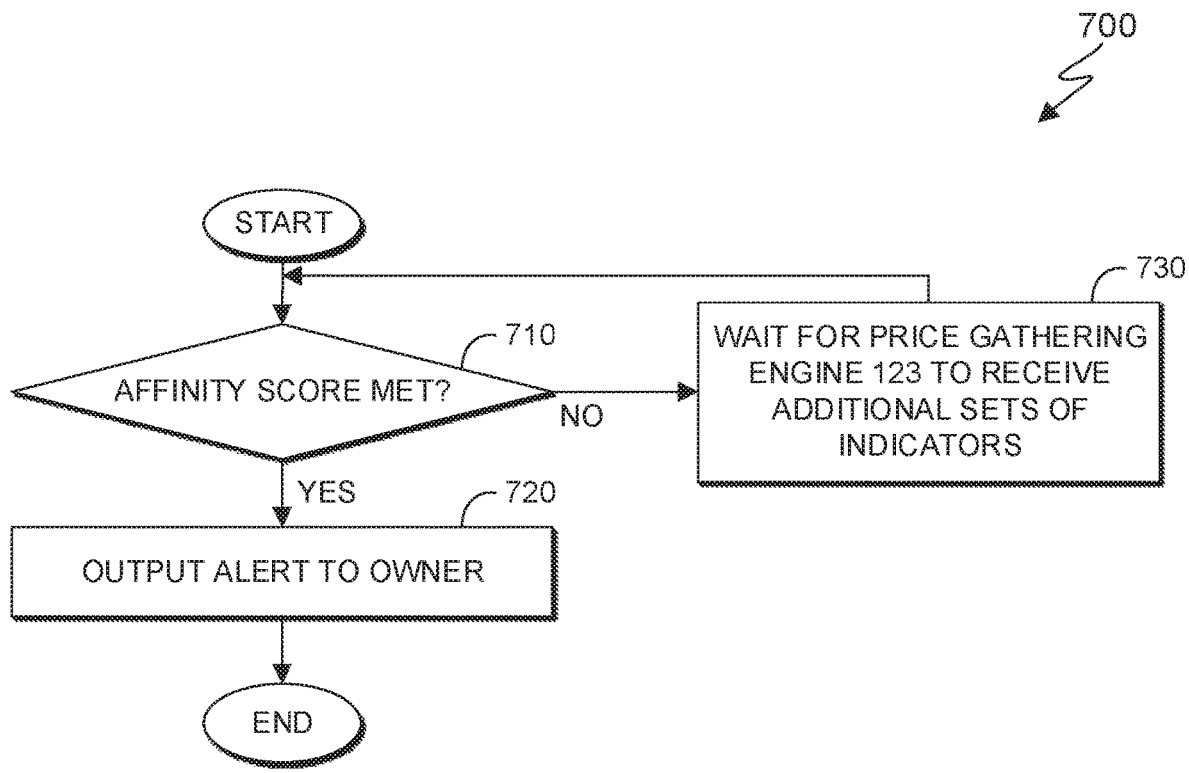
FIG. 7 depicts a flowchart of the steps for a third component of the migration management program executed within the cloud migration environment of FIG. 3, in accordance with an embodiment of the present invention.

FIG. 7 depicts flowchart 700 of the steps for broker 324 of migration management program 321 executed within cloud migration environment 300 as depicted in FIG. 3, in accordance with an embodiment of the present invention. In an embodiment, broker 324 determines whether an affinity score is met for a cloud provider. In an embodiment, responsive to the affinity score being met, broker 324 outputs an alert to an owner of the cloud service. In another embodiment, responsive to the affinity score being met, broker 324 determines that the cloud service should be migrated to the alternate cloud provider that met the affinity score. It should be appreciated that the process depicted in FIG. 5 illustrates one possible iteration of the process flow.

In decision 710, broker 324 determines whether an affinity score is met. The affinity score is the tipping point where migration of the owner's cloud service from a source cloud provider to an alternate cloud provider becomes attractive because the alternate cloud provider is more efficient in terms of cost and performance in comparison to the other cloud providers of the set of cloud providers. More specifically, the affinity score is equivalent to the value of a set of resources, which form the desired cloud service, plus the amount of work required to migrate the service. In an embodiment, broker 324 determines whether the affinity score is met by assessing the scores calculated in step 430 by price gathering engine 323.

If broker 324 determines the affinity score has been met (decision 710, YES branch), then broker 324 outputs an alert to a user suggesting the migration of the owner's cloud service to target 340 (step 720). If broker 324 determines the affinity score has not been met (decision 710, NO branch), then broker 324 waits for price gathering engine 323 to receive additional sets of indicators from the set of cloud providers (step 730).

In step 720, broker 324 outputs an alert. In an embodiment, broker 324 outputs an alert to an owner of the cloud service, e.g., cloud service 331. In an embodiment, broker 324 outputs an alert to the owner via user computing device 350. In an embodiment, broker 324 outputs an alert to the owner if it is determined that the affinity score has been met. In an embodiment, broker 324 outputs an alert to the owner suggesting the migration of the owner's cloud service to alternate cloud provider 340-A, the alternate cloud provider that met the affinity score.

In another embodiment (not shown), if broker 324 determines the affinity score has been met (decision 710, YES branch), then broker 324 determines the cloud service should be migrated to the alternate cloud provider that met the affinity score. In this embodiment, an owner of the cloud service does not need to approve of the migration before the transition engine 325 begins the migration process. In this embodiment, step 810 (below) would not need to occur and the transition engine would begin the migration process at step 620.

Figure 8:
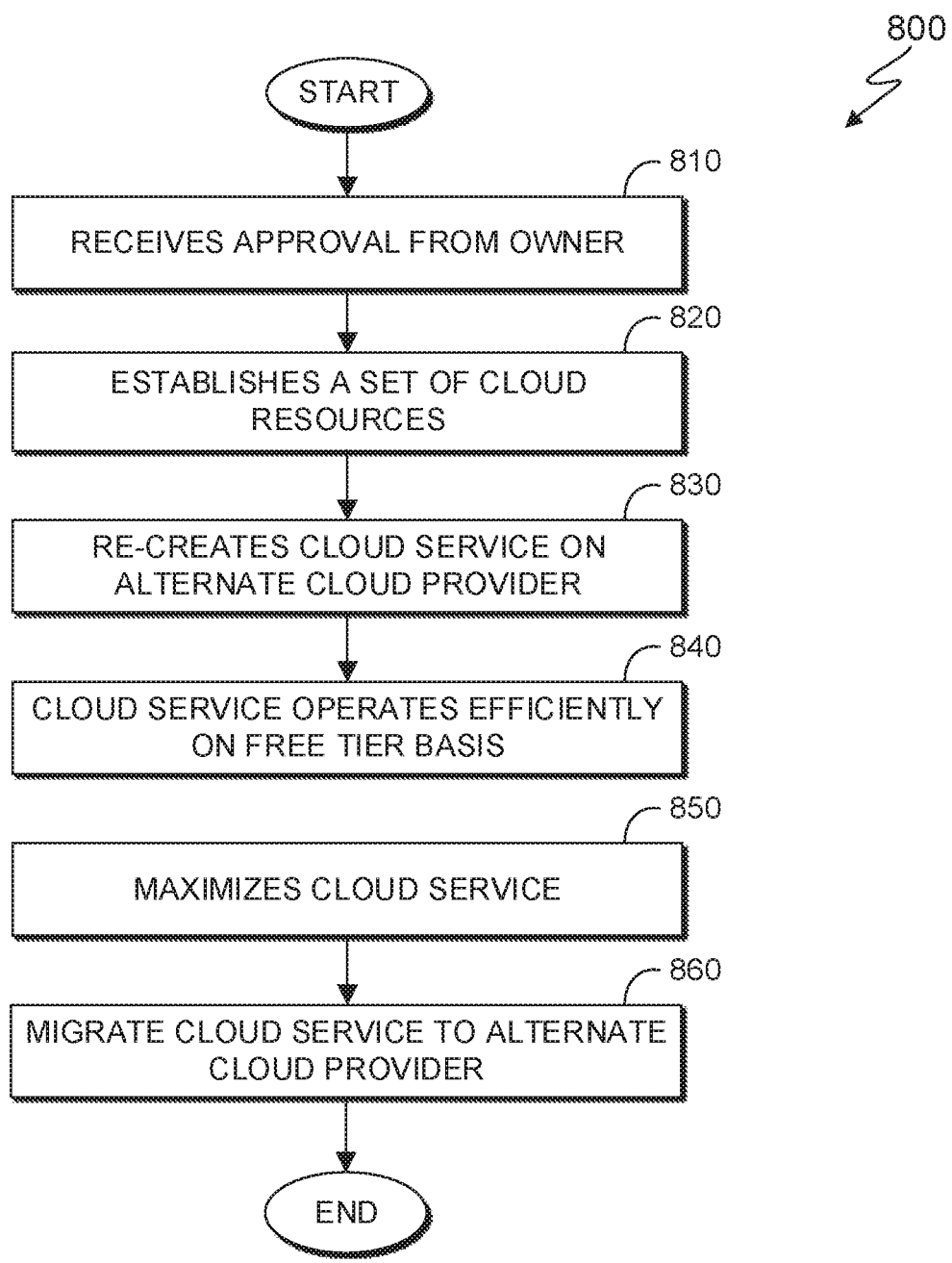
FIG. 8 depicts a flowchart of the steps for a fourth component of the migration management program executed within the cloud migration environment of FIG. 3, in accordance with an embodiment of the present invention.

FIG. 8 depicts flowchart 800 of the steps for transition engine 325 of migration management program 321 executed within cloud migration environment 300 as depicted in FIG. 3, in accordance with an embodiment of the present invention. In an embodiment, transition engine 325 receives approval from the owner to migrate cloud service 331 to alternate cloud provider 340-A. In an embodiment, transition engine 325 establishes a set of cloud resources to re-create cloud service 331. In an embodiment, transition engine 325 re-creates the cloud service on alternate cloud provider 340-A on a free tier basis. In an embodiment, transition engine 325 determines whether the cloud service operated efficiently on the free tier basis. In an embodiment, transition engine 325 maximizes the cloud service. In an embodiment, transition engine 325 migrates cloud service 331 and any associated resources and data. It should be appreciated that the process depicted in FIG. 8 illustrates one possible iteration of the process flow.

In step 810, transition engine 325 receives approval from the owner. In an embodiment, transition engine 325 receives approval from the owner to migrate the cloud service to the alternate cloud provider determined to be more efficient in terms of cost and performance. For example, transition engine 325 receives approval from the owner of cloud service 331 to migrate from source cloud provider 330 to alternate cloud provider 340-A.

In step 820, transition engine 325 establishes a set of cloud resources. In an embodiment, transition engine 325 establishes a set of cloud resources for the purpose of creating the infrastructure to be able to re-create cloud service 331 on alternate cloud provider 340-A.

In step 830, transition engine 325 re-creates the cloud service. In an embodiment, transition engine 325 re-creates the cloud service on alternate cloud provider 340-A. In an embodiment, transition engine 325 re-creates the cloud service on a free tier basis, which means the cloud service is minimized enough that the cloud service is free, i.e., there is no cost, to run on the alternate cloud provider. In other embodiments, transition engine 325 re-creates the cloud service on a paid tier basis, which has associated costs. In other embodiments, transition engine 325 re-creates the cloud service with a combination of free tiers and cost tiers.

In decision 840, transition engine 325 determines whether the cloud service operates efficiently on the free tier basis. If transition engine 325 determines the cloud service operates efficiently on the free tier basis (decision 840, YES branch), then transition engine 325 maximizes the cloud service (step 850). If transition engine 325 determines the cloud service does not operate efficiently on the free tier basis (decision 840, NO branch), then transition engine 325 continues to monitor for a more efficient cloud provider in terms of cost and performance (step 610).

In step 850, transition engine 325 maximizes the cloud service. In an embodiment, transition engine 325 maximizes the cloud service by a factor based on the efficiency of the executed sample workload on the alternate cloud provider. For example, if a cloud service originally had 300 container worker nodes and the executed sample workload on the alternate cloud provider indicated a 0.9 efficiency, then transition engine 325 maximizes the cloud service, that would have been minimized by a factor of 100 in step 530, by a factor of 90, because the alternate cloud provider can provide the cloud service with 270 container worker nodes.

In some embodiments, transition engine 325 performs canary testing. In an embodiment, transition engine 325 performs canary testing on the cloud service, e.g., cloud service 331. Canary testing is used to test how the cloud service will run for a small subset of end users on the alternate cloud provider, e.g., alternate cloud provider 340-A. If canary testing is successful, transition engine 325 will continue with migrating the cloud service.

In step 870, transition engine 325 migrates cloud service 331. In an embodiment, transition engine 325 migrates cloud service 331 and any associated resources and data from source cloud provider 330 to alternate cloud provider 340-A. The migration process can be formalized in a mathematical process in which R is the sum of all cloud resources running on a given cloud provider. The cloud archive, e.g., cloud archive 326, transforms the resources into a human readable, generalized, portable format A such that $f(R)=A$, $f^{-1}(A)=R$, $g^{-1}(A)=R'$, where g is a transformation to another cloud provider's workload R', and so that the portable format can be re-created on the same or another cloud provider. An individual workload resource r can be transformed to and from a specific cloud provider such that $t(r)=a$ and $t^{-1}(a)=r$, where a is an individual resource in the portable format. This results in the following resource migration: $f(R)=sum[t(r)]=A$ and $f(A)=sum[t(a)]=R$.

Figure 9:
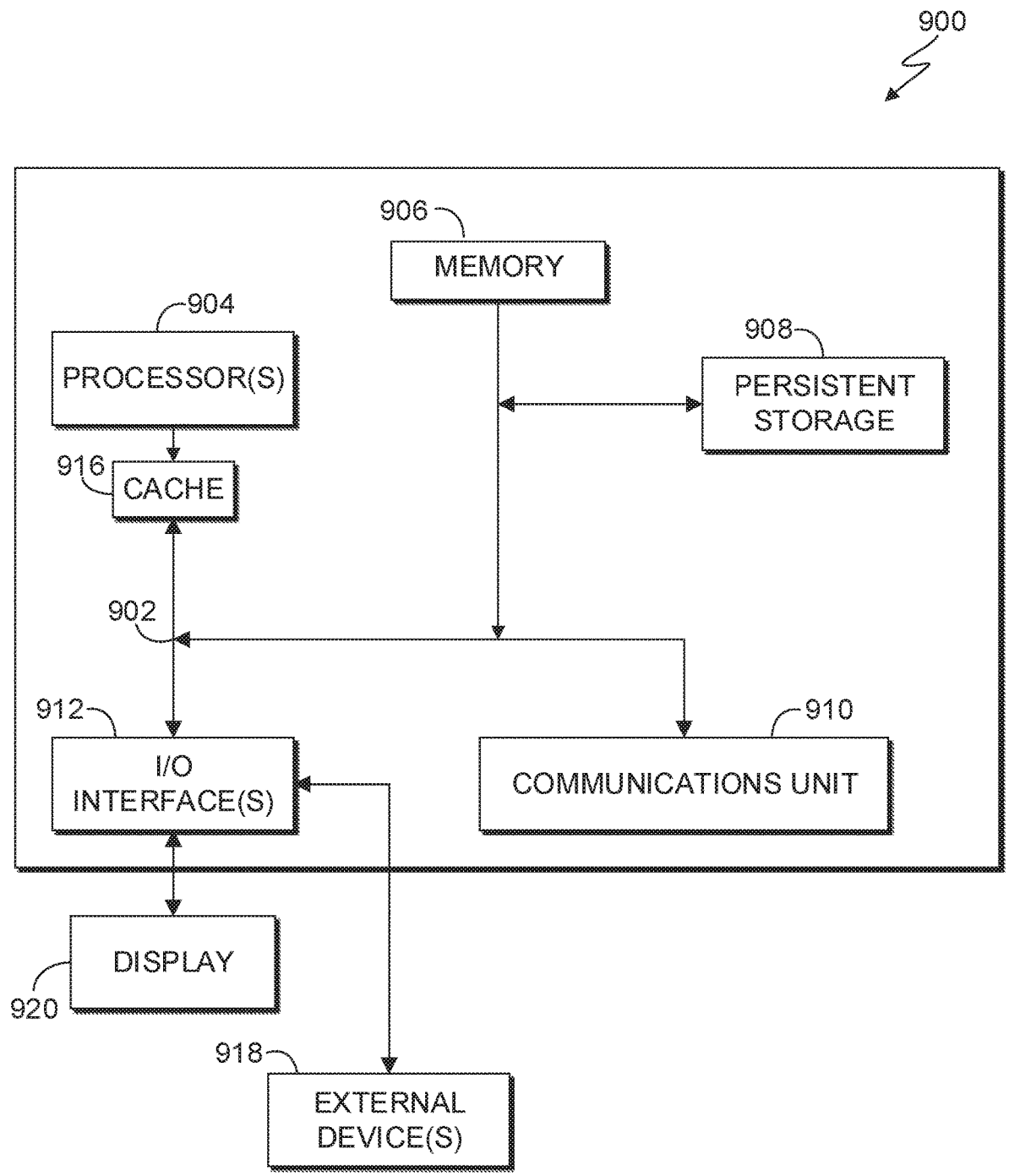
FIG. 9 depicts a block diagram of the components of a computing device executing the migration management program, in accordance with an embodiment of the present invention.

FIG. 9 depicts a block diagram of components of a computer 900, executing migration management program 321, in accordance with an embodiment of the present invention. It should be appreciated that FIG. 9 provides only an illustration of one implementation and does not imply any limitations with regard to the environments in which different embodiments may be implemented. Many modifications to the depicted environment may be made.

As depicted, computer 900 includes a communications fabric 902, which provides communications between cache 916, memory 906, persistent storage 908, communications unit 910, and input/output (I/O) interface(s) 912. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM). In general, memory 906 can include any suitable volatile or non-volatile computer-readable storage media. Cache is a fast memory that enhances the performance of computer processor(s) 904 by holding recently accessed data, and data near accessed data, from memory 906.

Migration management program 321 may be stored in memory 906 and in persistent storage 908 for execution by one or more of the respective computer processors 904 via cache 916. In an embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Communications unit 910, in these examples, provides for communications with other data processing systems or devices. In these examples, communications unit 910 includes one or more network interface cards. Communications unit 910 may provide communications through the use of either or both physical and wireless communications links. Programs may be downloaded to persistent storage 908 through communications unit 910.

I/O interface(s) 912 allows for input and output of data with other devices that may be connected to server 320 and user computing device 350. For example, I/O interface 912 may provide a connection to external devices 918 such as a keyboard, keypad, a touch screen, and/or some other suitable input device. External devices 918 may also include portable computer-readable storage media such as, for example, thumb drives, portable optical or magnetic disks, and memory cards. Software and data used to practice embodiments of the present invention may be stored on such portable computer-readable storage media and may be loaded onto the persistent storage 908 via I/O interface(s) 912. The I/O interface(s) 912 may similarly connect to a display 920.

Display 920 provides a mechanism to display data to a user and may be, for example, a computer monitor.

Migration management program 321 described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for migrating cloud services between cloud providers comprising:
    transforming, by one or more processors, a set of Infrastructure as Code (IaC) resources of a cloud service on an initial cloud provider into a reference architecture to be deployed to a set of alternate cloud providers, wherein transforming comprises:
        translating, by one or more processors, the set of IaC resources into a standard format;
        minimizing, by one or more processors, the translated set of IaC resources by a factor to create the reference architecture;
        storing, by one or more processors, the reference architecture on a cloud archive; and
        deploying, by one or more processors, the reference architecture to the set of alternate cloud providers;
    gathering, by one or more processors, a set of indicators from each alternate cloud provider of the set of alternate cloud providers;
    comparing, by one or more processors, the set of indicators from each alternate cloud provider of the set of alternate cloud providers;
    responsive to determining that an affinity score was reached for an alternate cloud provider of the set of alternate cloud providers, outputting, by one or more processors, an alert to an owner of the cloud service, wherein the alert requests approval to migrate the cloud service from the initial cloud provider to the alternate cloud provider; and
    responsive to receiving approval from the owner, migrating, by one or more processors, the cloud service to the alternate cloud provider.

2. The computer-implemented method of claim 1, wherein transforming the set of IaC resources of the cloud service on the initial cloud provider into the reference architecture further comprises:
    identifying, by one or more processors, the set of IaC resources of the cloud service on the initial cloud provider; and
    executing, by one or more processors, a workload of the reference architecture on the set of alternate cloud providers.

3. The computer-implemented method of claim 1, wherein gathering the set of indicators comprises:
    receiving, by one or more processors, the set of indicators from the initial cloud provider and from each cloud provider of the set of alternate cloud providers; and
    mapping, by one or more processors, the set of indicators.

4. The computer-implemented method of claim 1, wherein the set of indicators includes a pricing indicator based on a first cost to run the cloud service, a second cost to re-create the cloud service on the alternate cloud provider, and a third cost to migrate the cloud service from the initial cloud provider to the alternate cloud provider.

5. The computer-implemented method of claim 4, wherein the set of indicators further includes a performance indicator, a compliance indicator, a security indicator, and a reliability indicator.

6. The computer-implemented method of claim 1, wherein comparing the set of indicators from each alternate cloud provider of the set of alternate cloud providers comprises:
calculating, by one or more processors, a score for each alternate cloud provider of the set of alternate cloud providers; and
determining, by one or more processors, whether the affinity score was reached based on the score for each alternate cloud provider of the set of alternate cloud providers.

7. The computer-implemented method of claim 1, wherein migrating the cloud service to the alternate cloud provider comprises:
establishing, by one or more processors, a set of cloud resources to re-create the cloud service and associated resources and data on the alternate cloud provider;
re-creating, by one or more processors, the cloud service on the alternate cloud provider;
maximizing, by one or more processors, the cloud service by a factor; and
migrating, by one or more processors, the cloud service from the initial cloud provider to the alternate cloud provider of the set of cloud providers.

8. A computer program product comprising:
one or more computer-readable storage media and program instructions stored on the one or more computer-readable storage media, the program instructions comprising:
program instructions to transform a set of Infrastructure as Code (IaC) resources of a cloud service on an initial cloud provider into a reference architecture to be deployed to a set of alternate cloud providers, wherein the program instructions to transform comprise:
program instructions to translate the set of IaC resources into a standard format;
program instructions to minimize the translated set of IaC resources by a factor to create the reference architecture;
program instructions to store the reference architecture on a cloud archive; and
program instructions to deploy the reference architecture to the set of alternate cloud providers;
program instructions to gather a set of indicators from each alternate cloud provider of the set of alternate cloud providers;
program instructions to compare the set of indicators from each alternate cloud provider of the set of alternate cloud providers;
responsive to determining that an affinity score was reached for an alternate cloud provider of the set of alternate cloud providers, program instructions to output an alert to an owner of the cloud service, wherein the alert requests approval to migrate the cloud service from the initial cloud provider to the alternate cloud provider; and
responsive to receiving approval from the owner, program instructions to migrate the cloud service to the alternate cloud provider.

9. The computer program product of claim 8, wherein transforming the set of IaC resources of the cloud service on the initial cloud provider into the reference architecture comprises:
program instructions to identify the set of IaC resources of the cloud service on the initial cloud provider; and
program instructions to execute a workload of the reference architecture on the set of alternate cloud providers.

10. The computer program product of claim 8, wherein gathering the set of indicators comprises:
program instructions to receive the set of indicators from the initial cloud provider and from each cloud provider of the set of alternate cloud providers; and
program instructions to map the set of indicators.

11. The computer program product of claim 8, wherein the set of indicators includes a pricing indicator based on a first cost to run the cloud service, a second cost to re-create the cloud service on the alternate cloud provider, and a third cost to migrate the cloud service from the initial cloud provider to the alternate cloud provider.

12. The computer program product of claim 11, wherein the set of indicators further includes a performance indicator, a compliance indicator, a security indicator, and a reliability indicator.

13. The computer program product of claim 8, wherein comparing the set of indicators from each alternate cloud provider of the set of alternate cloud providers comprises:
program instructions to calculate a score for each alternate cloud provider of the set of alternate cloud providers; and
program instructions to determine whether the affinity score was reached based on the score for each alternate cloud provider of the set of alternate cloud providers.

14. The computer program product of claim 8, wherein migrating the cloud service to the alternate cloud provider comprises:
program instructions to establish a set of cloud resources to re-create the cloud service and associated resources and data on the alternate cloud provider;
program instructions to re-create the cloud service on the alternate cloud provider;
program instructions to maximize the cloud service by a factor; and
program instructions to migrate the cloud service from the initial cloud provider to the alternate cloud provider of the set of cloud providers.

15. A computer system comprising:
one or more computer processors;
one or more computer-readable storage media;
program instructions stored on the computer-readable storage media for execution by at least one of the one or more processors, the program instructions comprising:
program instructions to transform a set of Infrastructure as Code (IaC) resources of a cloud service on an initial cloud provider into a reference architecture to be deployed to a set of alternate cloud providers, wherein the program instructions to transform comprise:
program instructions to translate the set of IaC resources into a standard format;
program instructions to minimize the translated set of IaC resources by a factor to create the reference architecture;
program instructions to store the reference architecture on a cloud archive; and
program instructions to deploy the reference architecture to the set of alternate cloud providers;

program instructions to gather a set of indicators from each alternate cloud provider of the set of alternate cloud providers;

program instructions to compare the set of indicators from each alternate cloud provider of the set of alternate cloud providers;

responsive to determining that an affinity score was reached for an alternate cloud provider of the set of alternate cloud providers, program instructions to output an alert to an owner of the cloud service, wherein the alert requests approval to migrate the cloud service from the initial cloud provider to the alternate cloud provider; and responsive to receiving approval from the owner, program instructions to migrate the cloud service to the alternate cloud provider.

16. The computer system of claim 15, wherein transforming the set of IaC resources of the cloud service on the initial cloud provider into the reference architecture comprises:

program instructions to identify the set of IaC resources of the cloud service on the initial cloud provider; and program instructions to execute a workload of the reference architecture on the set of alternate cloud providers.

17. The computer system of claim 15, wherein gathering the set of indicators comprises:

program instructions to receive the set of indicators from the initial cloud provider and from each cloud provider of the set of alternate cloud providers; and program instructions to map the set of indicators.

18. The computer system of claim 17, wherein the set of indicators includes a pricing indicator based on a first cost to run the cloud service, on a second cost to re-create the cloud service on the alternate cloud provider, and on a third cost to migrate the cloud service from the initial cloud provider to the alternate cloud provider; a performance indicator; a compliance indicator; a security indicator; and a reliability indicator.

19. The computer system of claim 15, wherein comparing the set of indicators from each alternate cloud provider of the set of alternate cloud providers comprises:

program instructions to calculate a score for each alternate cloud provider of the set of alternate cloud providers; and program instructions to determine whether the affinity score was reached based on the score for each alternate cloud provider of the set of alternate cloud providers.

20. The computer system of claim 15, wherein migrating the cloud service to the alternate cloud provider comprises:

program instructions to establish a set of cloud resources to re-create the cloud service and associated resources and data on the alternate cloud provider;

program instructions to re-create the cloud service on the alternate cloud provider;

program instructions to maximize the cloud service by a factor; and program instructions to migrate the cloud service from the initial cloud provider to the alternate cloud provider of the set of cloud providers.

* * * * *